United States Patent
Brown et al.

(10) Patent No.: US 7,451,032 B2
(45) Date of Patent: Nov. 11, 2008

(54) SYSTEM AND METHOD FOR DETERMINING DESIRED YAW RATE AND LATERAL VELOCITY FOR USE IN A VEHICLE DYNAMIC CONTROL SYSTEM

(75) Inventors: Todd A. Brown, Dearborn, MI (US); Daniel D. Eisele, Ann Arbor, MI (US); Michael P. Lopez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 795 days.

(21) Appl. No.: 10/860,741

(22) Filed: Jun. 2, 2004

(65) Prior Publication Data

US 2005/0273240 A1 Dec. 8, 2005

(51) Int. Cl.
*B60T 8/24* (2006.01)
*B60T 8/32* (2006.01)
(52) U.S. Cl. .............................. 701/70; 701/38; 701/74; 340/440; 340/52; 340/429; 303/146; 182/282
(58) Field of Classification Search .................... 701/38, 701/45, 70, 37, 91, 124, 74; 340/440, 446, 340/429, 52; 280/735; 182/282; 180/197; 303/146
See application file for complete search history.

(56) References Cited

U.S. PATENT DOCUMENTS 2,917,126 A 12/1959 Phillips
3,604,273 A 9/1971 Kwok et al.
3,608,925 A 9/1971 Murphy
3,797,893 A 3/1974 Burckhardt
3,899,028 A 8/1975 Morris et al.
3,948,567 A 4/1976 Kasselmann et al.

(Continued)

FOREIGN PATENT DOCUMENTS

EP 0 430 813 12/1993

(Continued)

OTHER PUBLICATIONS

The development of vehicle stability control at Ford; Tseng, H.E.; Ashrafi, B.; Madau, D.; Allen Brown, T.; Recker, D.; Mechatronics, IEEE/ASME Transactions on; vol. 4, Issue 3, Sep. 1999 pp. 223-234; Digital Object Identifier 10.1109/3516.789681.*

(Continued)

*Primary Examiner*—Cuong H Nguyen
(74) *Attorney, Agent, or Firm*—Fredrick V. Owens

(57) ABSTRACT

A control system (18) and method for an automotive vehicle (10) includes a lateral acceleration sensor (32) for generating a lateral acceleration signal, a yaw rate sensor (28) for generating a yaw rate signal, and a safety system. The safety system (44) and the sensors are coupled to a controller (26). The controller (26) determines a front lateral tire force and a rear lateral tire force from the vehicle yaw rate signal and the vehicle lateral acceleration signal; determines a calculated lateral velocity from the front lateral tire force, the rear lateral tire force, and a bank angle; determines a calculated yaw rate from the front lateral tire force and the rear lateral tire force; and controls the safety system in response to the calculated lateral velocity and the calculated yaw rate.

35 Claims, 3 Drawing Sheets

U.S. PATENT DOCUMENTS

| | | |
|---|---|---|
| 3,972,543 A | 8/1976 | Presley et al. |
| 4,023,864 A | 5/1977 | Lang et al. |
| RE30,550 E | 3/1981 | Reise |
| 4,294,113 A | 10/1981 | Sprott et al. |
| 4,480,714 A | 11/1984 | Yabuta et al. |
| 4,548,079 A | 10/1985 | Klatt |
| 4,592,565 A | 6/1986 | Eagle |
| 4,597,462 A | 7/1986 | Sano et al. |
| 4,624,476 A | 11/1986 | Tanaka et al. |
| 4,650,212 A | 3/1987 | Yoshimura |
| 4,679,808 A | 7/1987 | Ito et al. |
| 4,690,553 A | 9/1987 | Fukamizu et al. |
| 4,696,489 A | 9/1987 | Fujishiro et al. |
| 4,705,130 A | 11/1987 | Fukunaga et al. |
| 4,712,807 A | 12/1987 | Kurosawa |
| 4,761,022 A | 8/1988 | Ohashi |
| 4,765,649 A | 8/1988 | Ikemoto et al. |
| 4,767,588 A | 8/1988 | Ito |
| 4,778,773 A | 10/1988 | Sukegawa |
| 4,797,823 A | 1/1989 | Ikemoto et al. |
| 4,809,183 A | 2/1989 | Eckert |
| 4,827,416 A | 5/1989 | Kawagoe et al. |
| 4,846,496 A | 7/1989 | Tanaka et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,002,142 A | 3/1991 | Klosterhaus |
| 5,033,770 A | 7/1991 | Kamimura et al. |
| 5,058,017 A | 10/1991 | Adachi et al. |
| 5,066,041 A | 11/1991 | Kindermann et al. |
| 5,085,458 A | 2/1992 | Kii et al. |
| 5,088,040 A | 2/1992 | Matsuda et al. |
| 5,089,967 A | 2/1992 | Haseda et al. |
| 5,097,917 A | 3/1992 | Serizawa et al. |
| 5,159,553 A | 10/1992 | Karnopp et al. |
| 5,163,319 A | 11/1992 | Spies et al. |
| 5,189,920 A | 3/1993 | Martinez |
| 5,200,896 A | 4/1993 | Sato et al. |
| 5,208,749 A | 5/1993 | Adachi et al. |
| 5,217,248 A | 6/1993 | Reast |
| 5,224,765 A | 7/1993 | Matsuda |
| 5,228,757 A | 7/1993 | Ito et al. |
| 5,230,396 A | 7/1993 | Yasui |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,274,576 A | 12/1993 | Williams |
| 5,278,761 A | 1/1994 | Ander et al. |
| 5,282,134 A | 1/1994 | Gioutsos et al. |
| 5,297,646 A | 3/1994 | Yamamura et al. |
| 5,307,274 A | 4/1994 | Takata et al. |
| 5,311,431 A | 5/1994 | Cao et al. |
| 5,311,956 A | 5/1994 | Sugiyama |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,438,515 A | 8/1995 | Miichi et al. |
| 5,446,658 A | 8/1995 | Pastor et al. |
| 5,455,770 A | 10/1995 | Hadeler et al. |
| 5,490,063 A | 2/1996 | Zabler et al. |
| 5,510,989 A | 4/1996 | Zabler et al. |
| 5,515,277 A | 5/1996 | Mine |
| 5,548,536 A | 8/1996 | Ammon |
| 5,549,328 A | 8/1996 | Cubalchini |
| 5,560,688 A | 10/1996 | Schappler et al. |
| 5,576,957 A | 11/1996 | Asanuma et al. |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,684,702 A | 11/1997 | Phillips et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,719,790 A | 2/1998 | Lohrenz et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,740,877 A | 4/1998 | Sasaki |
| 5,742,918 A * | 4/1998 | Ashrafi et al. ................ 701/70 |
| 5,742,919 A | 4/1998 | Ashrafi et al. |
| 5,762,406 A * | 6/1998 | Yasui et al. ................ 303/146 |
| 5,774,819 A | 6/1998 | Yamamoto |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,842,143 A | 11/1998 | Lohrenz et al. |
| 5,857,160 A | 1/1999 | Dickinson et al. |
| 5,857,535 A | 1/1999 | Brooks |
| 5,869,943 A | 2/1999 | Nakashima et al. |
| 5,878,357 A | 3/1999 | Sivashankar et al. |
| 5,890,084 A | 3/1999 | Halasz et al. |
| 5,893,896 A * | 4/1999 | Imamura et al. ............. 701/70 |
| 5,925,083 A | 7/1999 | Ackermann |
| 5,926,087 A | 7/1999 | Busch |
| 5,931,546 A | 8/1999 | Nakashima et al. |
| 5,931,887 A | 8/1999 | Hac |
| 5,935,181 A | 8/1999 | Iwasaki |
| 5,941,920 A | 8/1999 | Schubert |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,965,808 A | 10/1999 | Normann |
| 5,971,503 A | 10/1999 | Joyce et al. |
| 6,002,974 A | 12/1999 | Schiffman |
| 6,002,975 A | 12/1999 | Schiffman et al. |
| 6,026,926 A | 2/2000 | Noro et al. |
| 6,038,495 A | 3/2000 | Schiffman |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,133 A | 7/2000 | Keuper et al. |
| 6,085,860 A | 7/2000 | Hackl et al. |

| | | | |
|---|---|---|---|
| 6,086,168 A | 7/2000 | Rump | |
| 6,089,344 A | 7/2000 | Baughn et al. | |
| 6,104,284 A | 8/2000 | Otsuka | |
| 6,121,873 A | 9/2000 | Yamada et al. | |
| 6,122,568 A | 9/2000 | Madau et al. | |
| 6,122,584 A | 9/2000 | Lin et al. | |
| 6,129,172 A | 10/2000 | Yoshida | |
| 6,141,604 A | 10/2000 | Mattes et al. | |
| 6,141,605 A | 10/2000 | Joyce | |
| 6,144,904 A | 11/2000 | Tseng | |
| 6,149,251 A | 11/2000 | Wuerth et al. | |
| 6,161,905 A | 12/2000 | Hac et al. | |
| 6,167,357 A | 12/2000 | Zhu | |
| 6,169,939 B1 | 1/2001 | Raad et al. | |
| 6,169,946 B1 | 1/2001 | Griessbach | |
| 6,170,594 B1 | 1/2001 | Gilbert | |
| 6,176,555 B1 | 1/2001 | Semsey | |
| 6,178,375 B1 | 1/2001 | Breunig | |
| 6,179,310 B1 | 1/2001 | Clare et al. | |
| 6,179,394 B1 | 1/2001 | Browalski et al. | |
| 6,184,637 B1 | 2/2001 | Yamawaki et al. | |
| 6,185,485 B1 | 2/2001 | Ashrafti et al. | |
| 6,185,497 B1 | 2/2001 | Taniguchi et al. | |
| 6,186,267 B1 | 2/2001 | Hackl et al. | |
| 6,192,305 B1 | 2/2001 | Schiffmann | |
| 6,195,606 B1 | 2/2001 | Barta et al. | |
| 6,198,988 B1 | 3/2001 | Tseng | |
| 6,202,009 B1 | 3/2001 | Tseng | |
| 6,202,020 B1 | 3/2001 | Kyrtsos | |
| 6,206,383 B1 | 3/2001 | Burdock | |
| 6,219,604 B1 | 4/2001 | Dilger et al. | |
| 6,223,114 B1 | 4/2001 | Boros et al. | |
| 6,226,579 B1 | 5/2001 | Hackl et al. | |
| 6,227,482 B1 | 5/2001 | Yamamoto | |
| 6,232,875 B1 | 5/2001 | DeZorzi | |
| 6,233,510 B1 | 5/2001 | Platner et al. | |
| 6,236,916 B1 | 5/2001 | Staub et al. | |
| 6,263,261 B1 | 7/2001 | Brown et al. | |
| 6,266,596 B1 | 7/2001 | Hartman et al. | |
| 6,272,420 B1 | 8/2001 | Schramm et al. | |
| 6,278,930 B1 | 8/2001 | Yamada et al. | |
| 6,282,471 B1 | 8/2001 | Burdock et al. | |
| 6,282,472 B1 | 8/2001 | Jones et al. | |
| 6,282,474 B1 | 8/2001 | Chou et al. | |
| 6,290,019 B1 | 9/2001 | Kolassa et al. | |
| 6,292,734 B1 | 9/2001 | Murakami et al. | |
| 6,292,759 B1 | 9/2001 | Schiffmann | |
| 6,311,111 B1 | 10/2001 | Leimbach et al. | |
| 6,314,329 B1 | 11/2001 | Madau et al. | |
| 6,315,373 B1 | 11/2001 | Yamada et al. | |
| 6,321,141 B1 | 11/2001 | Leimbach | |
| 6,324,445 B2 | 11/2001 | Tozu et al. | |
| 6,324,446 B1 | 11/2001 | Brown et al. | |
| 6,324,458 B1 | 11/2001 | Takagi et al. | |
| 6,330,522 B1 | 12/2001 | Takeuchi | |
| 6,332,104 B1 | 12/2001 | Brown et al. | |
| 6,338,012 B2 | 1/2002 | Brown et al. | |
| 6,349,247 B1 | 2/2002 | Schramm et al. | |
| 6,351,694 B1 | 2/2002 | Tseng et al. | |
| 6,352,318 B1 | 3/2002 | Hosomi et al. | |
| 6,356,188 B1 | 3/2002 | Meyers et al. | |
| 6,360,147 B1 | 3/2002 | Lee | |
| 6,363,309 B1 | 3/2002 | Irie et al. | |
| 6,366,844 B1 | 4/2002 | Woywod et al. | |
| 6,370,938 B1 | 4/2002 | Leimbach et al. | |
| 6,394,240 B1 | 5/2002 | Barwick | |
| 6,397,127 B1 | 5/2002 | Meyers et al. | |
| 6,419,240 B1 | 7/2002 | Burdock et al. | |
| 6,424,897 B1 | 7/2002 | Mattes et al. | |
| 6,427,102 B1 | 7/2002 | Ding | |
| 6,428,118 B1 | 8/2002 | Blosch | |
| 6,433,681 B1 | 8/2002 | Foo et al. | |
| 6,438,463 B1 | 8/2002 | Tobaru et al. | |
| 6,438,464 B1 | 8/2002 | Woywod et al. | |
| 6,453,226 B1 * | 9/2002 | Hac et al. | 701/48 |
| 6,456,194 B1 | 9/2002 | Carlson et al. | |
| 6,459,990 B1 | 10/2002 | McCall et al. | |
| 6,471,218 B1 | 10/2002 | Burdock et al. | |
| 6,477,480 B1 | 11/2002 | Tseng et al. | |
| 6,496,758 B2 | 12/2002 | Rhode et al. | |
| 6,496,763 B2 | 12/2002 | Griessbach | |
| 6,498,976 B1 | 12/2002 | Ehlbeck et al. | |
| 6,502,023 B1 | 12/2002 | Fukada | |
| 6,523,637 B1 | 2/2003 | Nakano et al. | |
| 6,526,342 B1 | 2/2003 | Burdock et al. | |
| 6,529,803 B2 | 3/2003 | Meyers et al. | |
| 6,529,811 B2 | 3/2003 | Watson et al. | |
| 6,542,073 B2 | 4/2003 | Yeh et al. | |
| 6,542,792 B2 | 4/2003 | Schubert et al. | |
| 6,547,022 B2 | 4/2003 | Hosomi et al. | |
| 6,547,343 B1 * | 4/2003 | Hac | 303/146 |
| 6,549,842 B1 * | 4/2003 | Hac et al. | 701/80 |
| 6,553,284 B2 | 4/2003 | Holst et al. | |
| 6,554,293 B1 | 4/2003 | Fennel et al. | |
| 6,556,908 B1 | 4/2003 | Lu et al. | |
| 6,559,634 B2 | 5/2003 | Yamada | |
| 6,593,849 B2 * | 7/2003 | Chubb et al. | 340/446 |
| 6,600,414 B2 | 7/2003 | Foo et al. | |
| 6,600,985 B2 | 7/2003 | Weaver | |
| 6,618,656 B2 | 9/2003 | Kueblbeck et al. | |
| 6,631,317 B2 | 10/2003 | Lu | |
| 6,637,543 B2 | 10/2003 | Card | |
| 6,650,971 B2 | 11/2003 | Haas | |
| 6,654,674 B2 | 11/2003 | Lu et al. | |
| 6,678,631 B2 | 1/2004 | Schiffmann | |
| 6,681,196 B2 | 1/2004 | Glaser et al. | |
| 6,681,881 B2 | 1/2004 | Andonian et al. | |
| 6,698,542 B2 | 3/2004 | Nishizaki et al. | |
| 6,718,248 B2 | 4/2004 | Lu | |
| 6,719,087 B2 | 4/2004 | Demerly | |
| 6,725,140 B2 | 4/2004 | Lu et al. | |
| 6,741,922 B2 | 5/2004 | Holler | |
| 6,745,624 B2 | 6/2004 | Porter | |
| 6,756,890 B1 | 6/2004 | Schramm et al. | |
| 6,766,875 B2 | 7/2004 | Yamamoto | |
| 6,784,794 B1 | 8/2004 | McQuade | |
| 6,799,092 B2 | 9/2004 | Lu | |
| 6,816,764 B2 | 11/2004 | Coelingh et al. | |
| 6,834,218 B2 | 12/2004 | Meyers et al. | |
| 6,856,868 B1 | 2/2005 | Le et al. | |
| 6,873,987 B1 | 3/2005 | Faye et al. | |
| 6,904,350 B2 * | 6/2005 | Lu et al. | 701/70 |
| 6,941,205 B2 * | 9/2005 | Hrovat et al. | 701/34 |
| 7,010,409 B2 * | 3/2006 | Lu et al. | 701/70 |
| 7,079,928 B2 * | 7/2006 | Lu et al. | 701/38 |
| 7,109,856 B2 * | 9/2006 | Lu et al. | 340/440 |
| 7,130,735 B2 * | 10/2006 | Brown et al. | 701/70 |
| 7,132,937 B2 * | 11/2006 | Lu et al. | 340/440 |
| 7,233,236 B2 * | 6/2007 | Lu et al. | 340/440 |
| 7,323,976 B2 * | 1/2008 | Lu et al. | 340/446 |
| 2002/0014799 A1 | 2/2002 | Nagae | |
| 2002/0040268 A1 | 4/2002 | Yamada et al. | |
| 2002/0056582 A1 | 5/2002 | Chubb | |
| 2002/0075139 A1 | 6/2002 | Yamamoto et al. | |
| 2002/0096003 A1 | 7/2002 | Yamada et al. | |
| 2002/0109310 A1 | 8/2002 | Lim | |
| 2002/0139599 A1 | 10/2002 | Lu | |
| 2002/0143451 A1 * | 10/2002 | Hac et al. | 701/48 |
| 2003/0040856 A1 | 2/2003 | Winner et al. | |
| 2003/0055549 A1 | 3/2003 | Barta et al. | |
| 2003/0109939 A1 | 6/2003 | Burgdorf et al. | |
| 2003/0163231 A1 * | 8/2003 | Meyers et al. | 701/1 |
| 2003/0171865 A1 | 9/2003 | Moser | |
| 2003/0182025 A1 | 9/2003 | Tseng et al. | |
| 2004/0010383 A1 | 1/2004 | Lu | |
| 2004/0019418 A1 * | 1/2004 | Lu et al. | 701/38 |

| | | | |
|---|---|---|---|
| 2004/0026158 | A1 | 2/2004 | Rieth et al. |
| 2004/0064246 | A1 | 4/2004 | Lu |
| 2004/0119335 | A1 | 6/2004 | Szabo et al. |
| 2004/0158368 | A1 | 8/2004 | Haas |
| 2004/0199314 | A1* | 10/2004 | Meyers et al. ............... 701/38 |
| 2004/0217647 | A1 | 11/2004 | Einig |
| 2005/0033486 | A1* | 2/2005 | Schmitt et al. ............... 701/1 |
| 2005/0080542 | A1* | 4/2005 | Lu et al. ............... 701/70 |
| 2005/0080543 | A1* | 4/2005 | Lu et al. ............... 701/70 |
| 2005/0102083 | A1* | 5/2005 | Xu et al. ............... 701/70 |
| 2005/0131604 | A1* | 6/2005 | Lu ............... 701/38 |
| 2005/0177296 | A1* | 8/2005 | Brown et al. ............... 701/70 |
| 2005/0273240 | A1* | 12/2005 | Brown et al. ............... 701/70 |
| 2006/0074530 | A1* | 4/2006 | Meyers et al. ............... 701/1 |
| 2006/0261937 | A1* | 11/2006 | Lu et al. ............... 340/446 |
| 2007/0106443 | A1* | 5/2007 | Lu ............... 701/70 |
| 2008/0059034 | A1* | 3/2008 | Lu ............... 701/71 |
| 2008/0086251 | A1* | 4/2008 | Lu et al. ............... 701/70 |
| 2008/0117035 | A1* | 5/2008 | Lu et al. ............... 340/440 |
| 2008/0120005 | A1* | 5/2008 | Lu et al. ............... 701/70 |

FOREIGN PATENT DOCUMENTS

| | | | |
|---|---|---|---|
| EP | 0 662 601 | | 7/1995 |
| EP | 0 758 601 | | 2/1997 |
| EP | 781695 | A2 * | 7/1997 |
| EP | 1 046 571 | | 4/2000 |
| EP | 1 197 409 | | 9/2001 |
| GB | 2257403 | | 1/1993 |
| GB | 2305479 | A * | 4/1997 |
| GB | 2 342 078 | | 4/2000 |
| GB | 2414815 | A * | 12/2005 |
| JP | 05319289 | A * | 12/1993 |
| JP | 06183363 | A * | 7/1994 |
| JP | 2002173012 | A * | 6/2002 |
| JP | 2005145155 | A * | 6/2005 |
| WO | WO 02/20318 | | 3/2002 |
| WO | WO 03/072397 | | 9/2003 |

OTHER PUBLICATIONS

A vehicle health monitoring system evaluated experimentally on a passenger vehicle; Ng, H.K.; Chen, R.H.; Speyer, J.L.; Control Systems Technology, IEEE Transactions on; vol. 14, Issue 5, Sep. 2006 pp. 854-870; Digital Object Identifier 10.1109/TCST.2006.879976.*
On the Use of Torque-Biasing Systems for Electronic Stability Control: Limitations and Possibilities; Piyabongkarn, D.; Lew, J. Y.; Rajamani, R.; Grogg, J. A.; Yuan, Q.; Control Systems Technology, IEEE Transactions on; vol. 15, Issue 3, May 2007 pp. 581-589.*
Driving skill characterization: A feasibility study; Yilu Zhang.; Lin, William C.; Yuen-Kwok Steve Chin; Robotics and Automation, 2008. ICRA 2008. IEEE International Conference on; May 19-23, 2008 pp. 2571-2576; Digital Object Identifier 10.1109/ROBOT.2008. 4543600.*
Sensor networks for vehicle dynamics control systems: A monitoring perspective; Rehm, Ansgar; Communications, Control and Signal Processing, 2008. ISCCSP 2008. 3rd International Symposium on; Mar. 12-14, 2008 pp. 263-268; Digital Object Identifier 10.1109/ ISCCSP.2008.4537231.*
Self-Adjusting Fuzzy Logic Control for Vehicle Lateral Control; Jie Ji; Yinong Li; Ling Zheng; Fuzzy Systems and Knowledge Discovery, 2007. FSKD 2007. Fourth International Conference on; vol. 2, Aug. 24-27, 2007 pp. 614-618; Digital Object Identifier 10.1109/ FSKD.2007.509.*
Vehicle Parameter Estimation and Stability Enhancement using the Principles of Sliding Mode; Ouladsine, M.; Shraim, H.; Fridman, L.; Noura, H.; American Control Conference, 2007. ACC '07; Jul. 9-13, 2007 pp. 5224-5229; Digital Object Identifier 10.1109/ACC.2007. 4282688.*
Experimental Investigation of a Narrow Leaning Vehicle Tilt Stability Control System; Kidane, S.; Rajamani, R.; Alexander, L.; Starr, P.; Donath, M.; American Control Conference, 2007. ACC '07; Jul. 9-13, 2007 pp. 1612-1617; Digital Object Identifier 10.1109/ACC. 2007.4282625.*
On the Control Allocation for Coordinated Ground Vehicle Dynamics Control Systems; Jummin Wang; Solis, J.M.; Longoria, R.G.; American Control Conference, 2007. ACC '07; Jul. 9-13, 2007 pp. 5724-5729; Digital Object Identifier 10.1109/ACC.2007.4282308.*
A grey-box identification of an LPV vehicle model for observer-based side slip angle estimation; Gaspar, P.; Szabo, Z.; Bokor, J.; American Control Conference, 2007. ACC '07; Jul. 9-13, 2007 pp. 2961-2966; Digital Object Identifier 10.1109/ACC.2007.4282629.*
Vehicle State Estimation for Roll Control System; Jihan Ryu; Moshchuk, N.K.; Shih-Ken Chen; American Control Conference, 2007. ACC '07; Jul. 9-13, 2007 pp. 1618-1623; Digital Object Identifier 10.1109/ACC.2007.4282456.*
A New EPS Control Strategy Based on Feedback of Yaw Rate and Lateral Acceleration; Mingfei Wang; Linlin Ci; Ping Zhan; Yongjun Xu; Intelligent Information Technology Application, Workshop on; Dec. 2-3, 2007 pp. 177-180; Digital Object Identifier 10.1109/IITA. 2007.64.*
U.S. Appl. No. 10/459,697, filed Jun. 11, 2003, Lu.
U.S. Appl. No. 10/849,590, filed May 20, 2004, Brown.
A method for reducing on-road rollovers—anti-rollover braking, Thomas J. Wielenga, Dynamotive, LLC, International Congress and Exposition, Detroit, Michigan, Mar. 1-4, 1999.
Eger, R., Majjad, R., Naser, N., "Rollover simulation based on a nonlinear model", SAE 98020.
Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.
Niii, N., Nishijima, Y., Nakagaw, K., "rollover analysis method of a large-size bus", JSAE 9540020, 1995.
Eger, R., Kiencke, U., "Modeling of rollover sequences", Control Engineering Practice 11 (2003) 209-216.
Chen, Bo-Chiuan, Peng, Huei; "A Real-time Rollover Threat Index for Sports Utility Vehicles", Proceedings of the American Control Conference, San Diego, CA, Jun. 1999.

* cited by examiner

SYSTEM AND METHOD FOR DETERMINING DESIRED YAW RATE AND LATERAL VELOCITY FOR USE IN A VEHICLE DYNAMIC CONTROL SYSTEM

TECHNICAL FIELD

The present invention relates generally to a control apparatus for controlling a system of an automotive vehicle in response to sensed dynamic behavior, and more specifically, to a method and apparatus for determining a desired yaw rate and lateral velocity from a driver's input.

BACKGROUND

Dynamic control system are currently offered in various vehicles. Dynamic control systems include roll stability control systems and yaw stability control systems. Other types of safety systems are also offered in vehicles such as deployment devices including active roll bars and side impact airbags. In such systems various control angles are determined which, in turn, are converted to control signals for deployment or control.

Various conditions of the road such as a bank or road crown affect how the driver must compensate. For example, the driver must compensate to the left when driving on a crowned road. The tire steering angles are also affected by the pitch or bank angles. Typically, control system models do not take into consideration the bank angles with respect to the driver steering input. Thus, such models are not capable of differentiating between a steering input that could cause a yaw vehicle response on a level road surface and one that is needed to maintain the vehicle path when compensating for a bank.

It is therefore desirable to provide a stability control system that takes into account the bank angle with respect to the control system.

SUMMARY OF THE INVENTION

It is therefore one object of the invention to provide a detection scheme that may be used in conjunction with the dynamic stability control system of the vehicle to determine the presence of a rollover.

In one aspect of the invention, a method of controlling a vehicle comprises the steps of determining a calculated lateral velocity from a front lateral tire force, a rear lateral tire force, and a bank angle; determining a calculated yaw rate from the front lateral tire force and the rear lateral tire force; and controlling a safety system in response to the calculated lateral velocity and the calculated yaw rate.

In another aspect of the invention, a control system for an automotive vehicle includes a lateral acceleration sensor for generating a lateral acceleration signal, a yaw rate sensor for generating a yaw rate signal, and a safety system. The safety system and the sensors are coupled to a controller. The controller determines a front lateral tire force and a rear lateral tire force from the vehicle yaw rate signal and the vehicle lateral acceleration signal; determines a calculated lateral velocity from the front lateral tire force, the rear lateral tire force, and a bank angle; determines a calculated yaw rate from the front lateral tire force and the rear lateral tire force; and controls the safety system in response to the calculated lateral velocity and the calculated yaw rate.

One advantage of the invention is that the driver's intent may be easily determined to take into account road angle variation.

Other advantages and features of the present invention will become apparent when viewed in light of the detailed description of the preferred embodiment when taken in conjunction with the attached drawings and appended claims.

DETAILED DESCRIPTION

Figure 1:
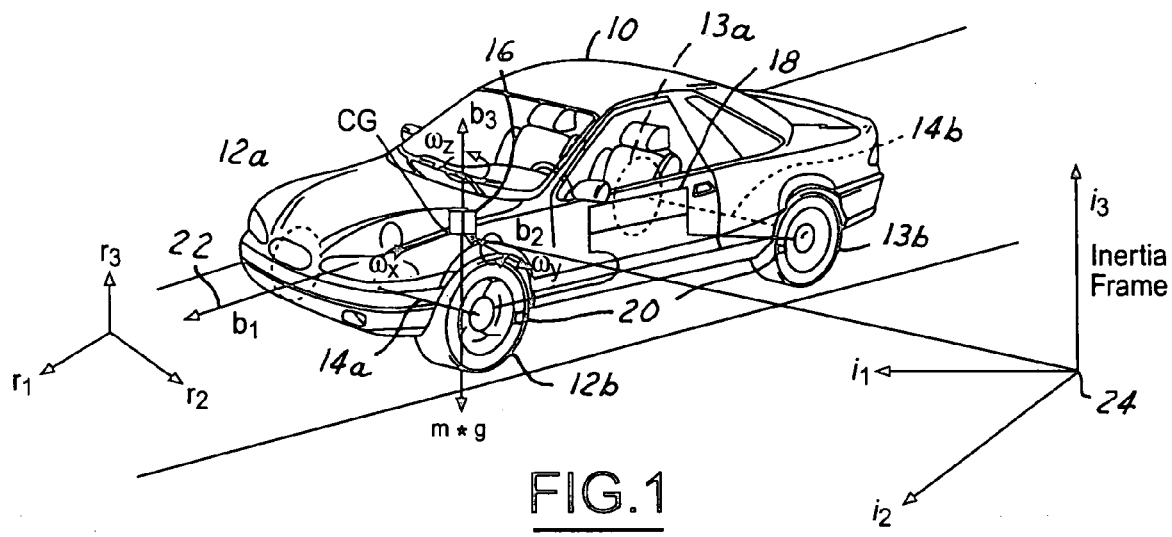
FIG. 1 is a diagrammatic view of a vehicle with variable vectors and coordinate frames according to the present invention.

In the following figures the same reference numerals will be used to identify the same components. The present invention is may be used in conjunction with a rollover control system for a vehicle. However, the present invention may also be used with a deployment device such as airbag or active roll bar. The present invention will be discussed below in terms of preferred embodiments relating to an automotive vehicle moving in a three-dimensional road terrain.

Referring to FIG. 1, an automotive vehicle 10 with a safety system of the present invention is illustrated with the various forces and moments thereon during a rollover condition. Vehicle 10 has front right (FR) and front left (FL) wheel/tires 12a and 12b and rear right (RR) wheel/tires 13a and rear left (RL) tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where g=9.8 m/s² and M is the total mass of the vehicle.

As mentioned above, the system may also be used with safety systems including active/semi-active suspension systems, anti-roll bar, or airbags or other safety devices deployed or activated upon sensing predetermined dynamic conditions of the vehicle.

The sensing system 16 is coupled to a control system 18. The sensing system 16 may comprise many different sensors including the sensor set typically found in a dynamic control system (including lateral accelerometer, yaw rate sensor, steering angle sensor and wheel speed sensor) together with a roll rate sensor, a vertical accelerometer, and a longitudinal accelerometer. The various sensors will be further described below. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x, y and z shown in FIG. 1. The lateral, vertical, and longitudinal acceleration and the roll, yaw and pitch rate may also be housed in an inertial measurement unit (IMU). As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $w_x$ for the roll rate, $w_y$ for the pitch rate and $w_z$ for the yaw rate. The present invention calculations may take place in an inertial frame 24 that may be derived from the body frame 22 as described below.

The angular rate sensors and the accelerometers may be mounted on the vehicle car body along the body frame directions $b_1$, $b_2$ and $b_3$, which are the x-y-z axes of the sprung mass of the vehicle.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$, $\theta_{ybr}$, and $\theta_{zbr}$, which are also called the relative Euler angles (i.e., relative roll, relative pitch and relative yaw angles, respectively).

Figure 2:
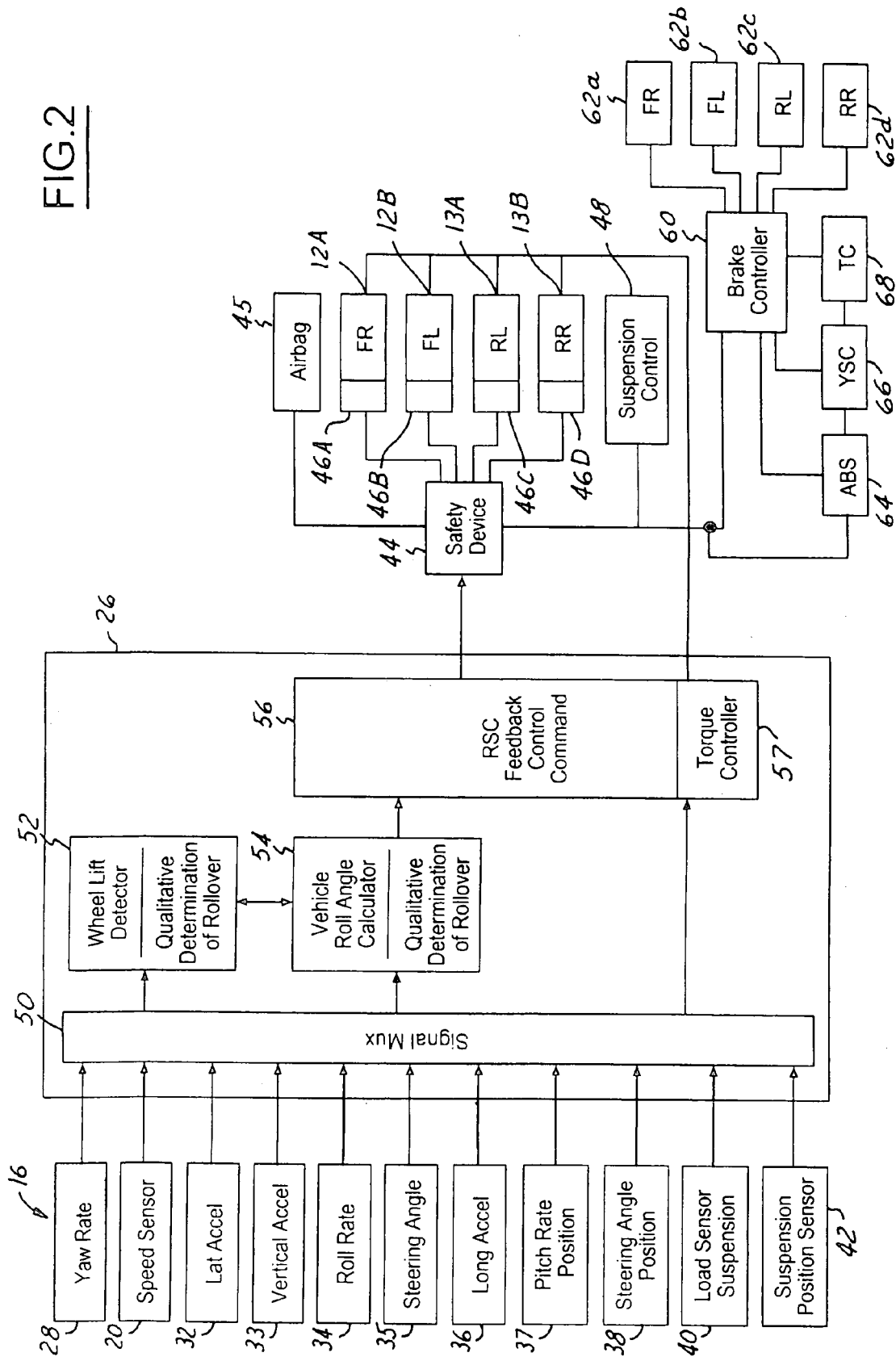
FIG. 2 is a block diagram of a stability system according to the present invention.

Referring now to FIG. 2, roll stability control system 18 is illustrated in further detail having a controller 26 used for receiving information from a number of sensors which may include a yaw rate sensor 28, a speed sensor 20, a lateral acceleration sensor 32, a vertical accelerometer sensor 33, a roll angular rate sensor 34, a steering wheel (hand wheel) angle sensor 35, a longitudinal acceleration sensor 36, a pitch rate sensor 37, steering angle position sensor 38 (of the wheels or actuator due to driver input at the road surface), suspension load sensor 40 and suspension position sensor 42. Some of these sensors may be grouped together in an IMU such as lateral acceleration, vertical acceleration, longitudinal acceleration, yaw, pitch and roll rates.

Controller 26 may include a signal multiplexer 50 that is used to receive the signals from the sensors 28-42. The signal multiplexer 50 that provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. Vehicle roll angle calculator 54 is described in provisional applications 60/400,376 and 60/400,172, and U.S. application Ser. No. 10/459,697, the disclosures of which are incorporated herein by reference.

In the preferred embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-42 may be used in a commercial embodiment. Safety device 44 may control an airbag 45 or a steering actuator 46A-46D at one or more of the wheels 12a, 12b, 13a, 13b of the vehicle 10. Also, other vehicle components such as a suspension control 48 may be used to adjust the suspension to prevent rollover.

Roll angular rate sensor 34 and pitch rate sensor 37 may sense the roll condition or lifting of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition or lifting based on sensing the linear or rotational relative displacement or displacement velocity of one or more of the suspension chassis components. This may be in addition to or in combination with suspension position sensor 42. The position sensor 42, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or lifting may also be sensed by sensing directly or estimating the force or torque associated with the loading condition of one or more suspension or chassis components including a pressure transducer in an act of air suspension, a shock absorber sensor such as a load sensor 40, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor. The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift. These are passive methods as well.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 42, controller 26 determines a roll condition and/or wheel lift and controls the steering position of the wheels.

Safety device 44 may be coupled to a brake controller 60. Brake controller 60 controls the amount of brake torque at a front right brake 62A, front left brake 62b, rear left brake 62c and a rear right brake 62d. Other safety systems such as an antilock brake system 64, a yaw stability control system 66 and a traction control system 68 may also benefit from the dynamic conditions determined herein. Using this information, the control strategy such as an amount of braking may be modified.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Load sensor 40 may be a load cell coupled to one or more suspension components. By measuring the stress, strain or weight on the load sensor a shifting of the load can be determined.

The roll condition of a vehicle can be characterized by the relative roll angle between the vehicle body and the wheel axle and the wheel departure angle (between the wheel axle and the average road surface). Both the relative roll angle and the wheel departure angle may be calculated in relative roll angle estimation module by using the roll rate and lateral acceleration sensor signals. If both the relative roll angle and the wheel departure angles are large enough, the vehicle may be in either single wheel lifting or double wheel lifting. On the other hand if the magnitude of both angles are small enough, the wheels are likely all grounded.

The roll condition of a vehicle can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up.

The roll condition of the vehicle can be characterized by the normal loading sustained at each wheel. Theoretically, when a normal loading at a wheel decreases to zero, the wheel is no longer contacting the road surface. In this case a potential rollover is under the way. Large magnitude of this loading indicates that the wheel is grounded.

The roll condition can be identified by checking the actual road torques applied to the wheels and the road torques which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel.

The roll condition of a vehicle can be characterized by the relative roll angle $\theta_{xr}$ the vehicle body and the wheel axle, which has been calculated by using the roll rate and lateral acceleration sensor signals. If this roll angle is increasing rapidly, the vehicle might be in the edge of wheel lifting or rollover. Small magnitude of this angle indicates the wheels are not lifted or are all grounded.

The roll condition of a vehicle can also be characterized by the roll angle between the wheel axle and the average road surface, this is called wheel departure angle. If this roll angle is increasing rapidly, the vehicle has lifted wheel or wheels and aggressive control action needs to be taken in order to prevent the vehicle from rolling over. Small magnitude of this angle indicates the wheels are not lifted. This section describes how to quantitatively determine the vehicle roll angle when a qualitative wheel lifting is identified. That is, if a qualitative wheel lifting is detected, a quantitative computation of the wheel lifting may be initiated.

Figure 3:
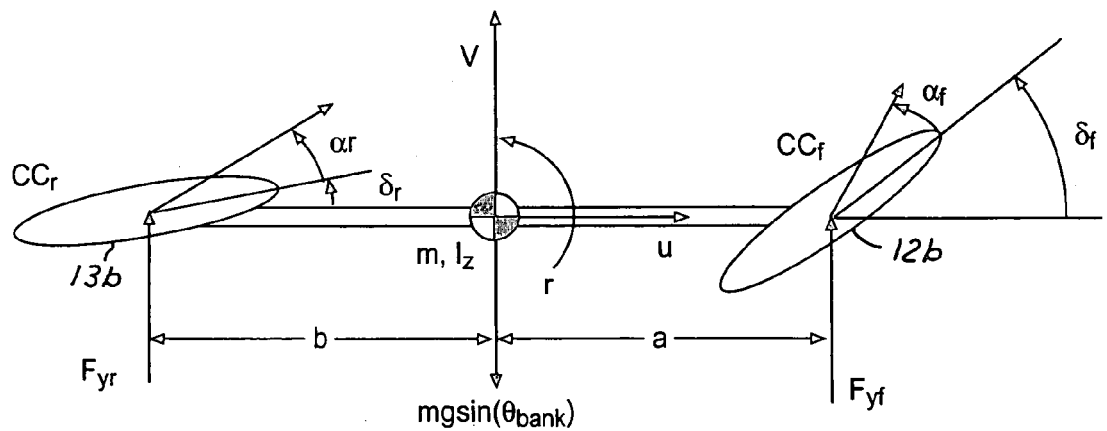
FIG. 3 is a bicycle model corresponding to a front wheel and a respective rear wheel of the vehicle.

Referring now to FIG. 3, a bicycle model is illustrated. The bicycle model essentially corresponds to a longitudinal half of the vehicle with front wheel 12b and rear wheel 13b. The model may also apply to the other side of the vehicle. In the following description the following constants are used:

$CC_f$, $CC_r$—cornering compliance of front and rear axles (rad/N)

a, b—distance from center of gravity to front and rear axles (m)

$$\frac{\partial \delta_f}{\partial \theta_{body}}, \frac{\partial \delta_r}{\partial \theta_{body}} - \text{gain from body roll angle about the } x$$

axis to steer angle for the front and rear axles (rad/rad)

$$\frac{\partial \delta_f}{\partial \phi}, \frac{\partial \delta_r}{\partial \phi} - \text{gain from body pitch angle about the } y \text{ axis}$$

to steer angle for the front and rear axles (rad/rad)

m—vehicle total mass (kg)
g—acceleration due to gravity (m/s^2)
$I_z$—vehicle yaw moment of inertia (kg–m^2)
In the following description the following inputs are used:
$\theta_{bank}$—road bank angle about the x axis (radians); this may be determined in various known ways such as in/(FGT 1660)
$\theta_{body}$—body roll angle (relative roll angle) about the x axis (radians); this may be determined in various known ways such as in (FGT 1660)
u—vehicle longitudinal speed along the x axis (m/s)1 this may be derived from the individual wheel speeds
$\delta_{driver}$—steering angle due to driver input (radians); this may be derived from a sensor or calculated based on SWA In the following description the following intermediate variables are used:
$F_{yf}$, $F_{yr}$—front and rear lateral tire forces (N)
$\alpha_f$, $\alpha_r$—front and rear tire slip angles. These are the angles between directions the tires are pointing, and the direction of the velocity vectors at the respective axles (radians)

Figure 4:
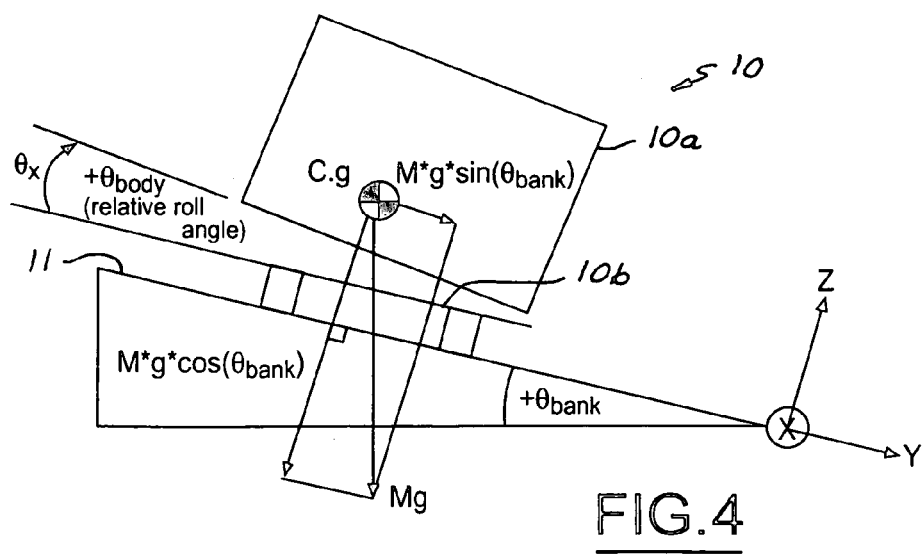
FIG. 4 is an end view of an automotive vehicle on a bank.

In the following description the following state variable are used:
r—vehicle rotational yaw rate about the z axis (rad/s)
v—vehicle lateral velocity along the y axis (m/s)
In the following description the following assumptions are used:
$\alpha_f$ and $\alpha_r$ are small
$\delta_r$ is small but $\delta_f$ can be large
Tire forces are normal to the plane of the tire Referring now to FIG. 4, a rear end view of the vehicle showing the relationship of the various angles of the vehicle 10 relative to the road surface 11 is illustrated. In the following a reference road bank angle $\theta_{bank}$ is shown relative to the vehicle 10 on a road surface. The vehicle 10 has a vehicle body 10a and wheel axle 10b. The body or relative roll angle $\theta_{body}$ is the angle between the wheel axle 10b and the body 10a. The global roll angle $\theta_x$ is the angle between the horizontal plane (e.g., at sea level) and the vehicle body 10a.

Figure 5:
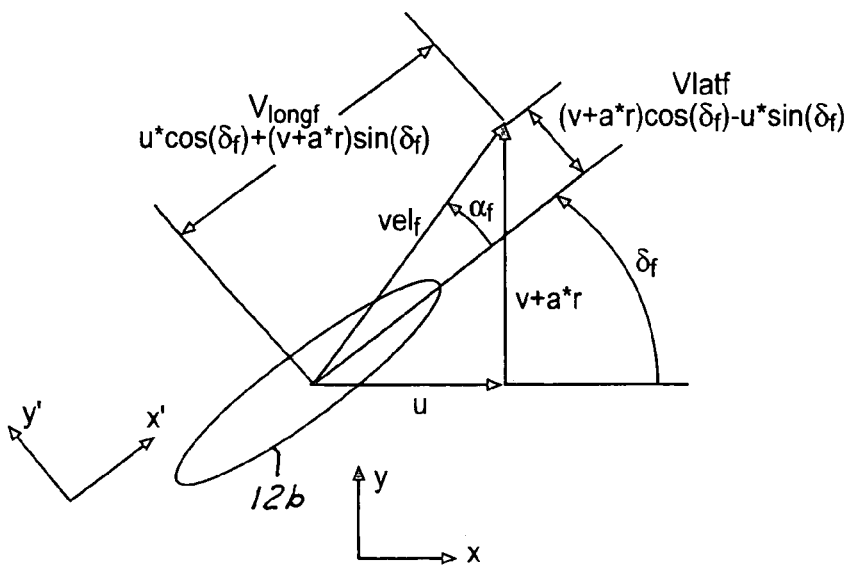
FIG. 5 is a top view of a wheel of a vehicle.

Referring now to FIG. 5, a plot illustrating front tire velocity projections is shown. The variable $vel_f$ is the resultant velocity of the front tires along the axis x'. The lateral velocity is v+a*r and the longitudinal velocity is u. These are used to form a projection onto the x' and y' axes.

Figure 6:
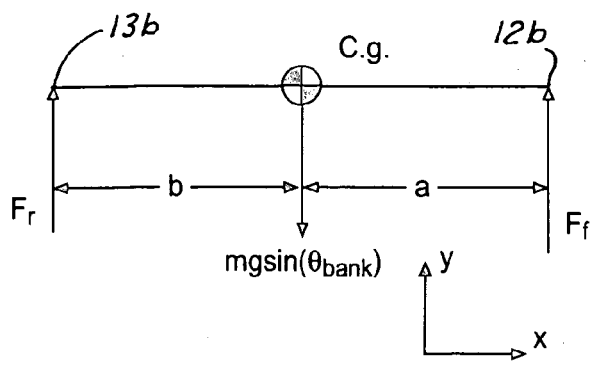
FIG. 6 is a representation of a front force and a rear force of a vehicle relative to the center of gravity.

Referring now to FIG. 6, a free body diagram of a vehicle showing the front lateral force $F_f$ and rear lateral force $F_r$ is illustrated. This diagram will be used to illustrate the sum of the forces and the sum of the moments about the center of gravity c.g. of the vehicle.

Figure 7:
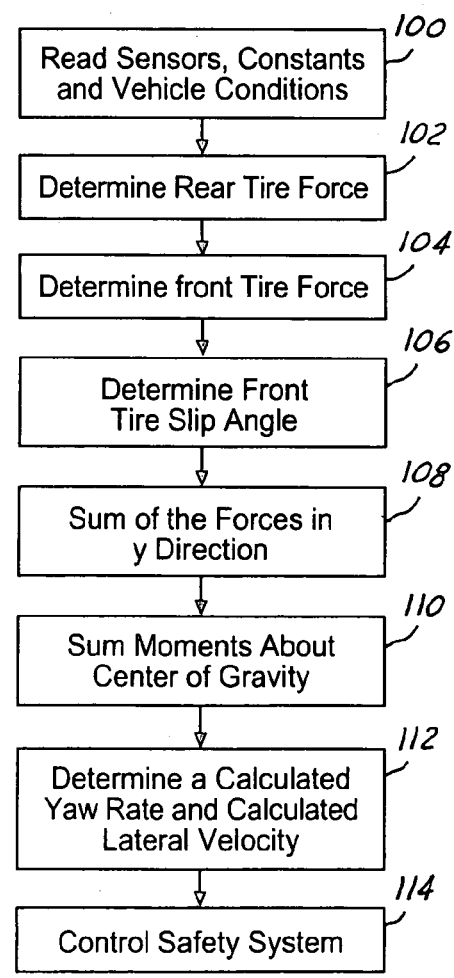
FIG. 7 is a high level flow chart illustrating condition detection and the resulting actions.

Referring now to FIG. 7, an equation of motion derivation is illustrated. However, first, the various sensors and constants and vehicle conditions are read or determined in step 100. In step 102, the equations of motion are formulated.

Equations of motion are formulated in the plane of the road. The rear tire force in the x direction is calculated by the following relation in step 102.

$$F_{yr} = -\frac{\alpha_r}{CC_r}$$

where the rear slip angle $\alpha_r$ is:

$$\alpha_r = \arctan\left(\frac{v_{latr}}{u}\right) - \delta_r \approx \frac{v_{latr}}{u} - \delta_r = \frac{v - b*r}{u} - \delta_r$$

The rear steering angle is given by:

$$\delta_r = \frac{\partial \delta_r}{\partial \theta_{body}} * \theta_{body} + \frac{\partial \delta_r}{\partial \phi} * \phi$$

In the front of the vehicle $\delta_f$ is not necessarily small as in the case of $\delta_r$. The front tire force in the x direction is determined in step 104 by:

$$F_{yf} = -\frac{\alpha_f}{CC_f} * \cos(\delta_f), \text{ where}$$

$$\delta_f = \delta_{driver} + \frac{\partial \delta_f}{\partial \theta_{body}} * \theta_{body} + \frac{\partial \delta_f}{\partial \phi} * \phi$$

Additionally, to determine the angle $\alpha_f$ between the resultant velocity of the front tires ($vel_f$) and the longitudinal axis of the tire (x'), the resultant velocity is projected onto lateral and longitudinal axes perpendicular and parallel to the wheel (x' and y'). To do this, the longitudinal velocity (u) and lateral velocity (v+a*r) components of the front tire velocity, in the body coordinate axes (x and y), can be projected onto the x' and y' axes through trigonometry. These projections, $v_{latf}$ and $v_{longf}$ can then be used to determine the slip angle of the tire. FIG. 5 shows the trigonometry used to obtain expressions for these projections. In step 106, the front tire slip angle can then be determined by:

$$\alpha_f = \arctan\left(\frac{v_{latf}}{v_{longf}}\right) \approx \frac{(v+a*r)*\cos(\delta_f) - u*\sin(\delta_f)}{u*\cos(\delta_f) + (v+a*r)*\sin(\delta_f)}$$

Taking the sum of forces in the y direction in step 108 and the sum of moments about the center of gravity in the z direction in step 110, the equations of motion are:

$$\sum F_y = m*a_y = m*\left(\frac{dv}{dt} + r*u\right) = F_{yr} + F_{yf} - m*g*\sin(\theta_{bank})$$

$$\sum M_{z-c.c.} = I_z * \frac{dr}{dt} = F_{yf}*a - F_{yr}*b$$

Note that the component of gravity due to the bank angle only affects the sum of forces in the y direction since the moments are summed about the center of gravity.

In step 112, the differential equations from steps 108 and 110 can be numerically integrated to obtain the vehicle state variables, a desired or calculated yaw rate, and a desired or calculated lateral velocity. The safety system(s) or device 44 of the control system 18 may then be controlled in step 114 according to these desired or calculated yaw rate and lateral velocity values. For example, a yaw rate system using these values takes into consideration values such as pitching and road bank angle such as in a crowning of the road.

Safety systems such as the yaw stability control (YSC) system 66 and rollover control systems may particularly benefit from such value determinations. Deploying device type safety devices such as side airbags 45 and active roll bars may also benefit.

While particular embodiments of the invention have been shown and described, numerous variations and alternate embodiments will occur to those skilled in the art. Accordingly, it is intended that the invention be limited only in terms of the appended claims.

What is claimed is:

1. A control system for a vehicle, said control system comprising:
    a yaw rate sensor operable to generate a vehicle yaw rate signal;
    a lateral acceleration sensor operable to generate a vehicle lateral acceleration signal;
    a safety system; and
    a controller coupled to said yaw rate sensor, said lateral acceleration sensor, and said safety system;
    wherein said controller is operable to determine a front lateral tire force and a rear lateral tire force from said vehicle yaw rate signal and said vehicle lateral acceleration signal; determine a calculated lateral velocity from said front lateral tire force, said rear lateral tire force, and a bank angle; determine a calculated yaw rate from said front lateral tire force and said rear lateral tire force; and control said safety system in response to said calculated lateral velocity and said calculated yaw rate.

2. A control system as recited in claim 1, wherein said safety system comprises a rollover control system.

3. A control system as recited in claim 1, wherein said safety system comprises a yaw stability control system.

4. A control system as recited in claim 1, wherein said calculated yaw rate is determined from said front lateral tire force, a first distance from a front axle to a center of gravity, a second distance from a rear axle to said center of gravity, and a rear lateral velocity.

5. A control system as recited in claim 1, wherein said rear lateral tire force is determined in response to a rear tire slip angle and a rear cornering compliance.

6. A control system as recited in claim 5, wherein said rear tire slip angle is determined from a vehicle lateral velocity, a yaw rate signal, and a vehicle longitudinal velocity.

7. A control system as recited in claim 5, wherein said rear tire slip angle is determined from a vehicle lateral velocity, a yaw rate signal, a vehicle longitudinal velocity, and a rear steering angle.

8. A control system as recited in claim 7, wherein said rear steering angle is determined by a gain from body roll due to a steering angle of a rear axle.

9. A control system as recited in claim 1, wherein said front lateral tire force is determined in response to a front tire slip angle and a front cornering compliance.

10. A control system as recited in claim 1, wherein said front lateral tire force is determined in response to a front tire slip angle, a front cornering compliance, and a front steering angle.

11. A control system as recited in claim 10, wherein said front steering angle is determined in response to a driver input steering angle, a first gain from a body roll angle due to a steering angle of a front axle, and a second gain from a body pitch angle due to a steering angle of said front axle.

12. A control system as recited in claim 10, wherein said front tire slip angle is determined from a vehicle longitudinal velocity, a vehicle lateral velocity, and a yaw rate signal from a yaw rate sensor.

13. A method of controlling a safety system for a vehicle, said method comprising the steps of:
 (a) generating a vehicle yaw rate signal;
 (b) generating a vehicle lateral acceleration signal;
 (c) operating a controller to determine a front lateral tire force and a rear lateral tire force from said vehicle yaw rate signal and said vehicle lateral acceleration signal;
 (d) operating said controller to determine a calculated lateral velocity from said front lateral tire force, said rear lateral tire force, and a bank angle;
 (e) operating said controller to determine a calculated yaw rate from said front lateral tire force and said rear lateral tire force; and
 (f) operating said controller to control said safety system in response to said calculated lateral velocity and said calculated yaw rate.

14. A method as recited in claim 13, wherein step (b) is at least partially accomplished with a lateral acceleration sensor.

15. A method as recited in claim 13, wherein step (a) is at least partially accomplished with a yaw rate sensor.

16. A method as recited in claim 13, wherein said calculated yaw rate is determined from said front lateral tire force, a first distance from a front axle to a center of gravity, a second distance from a rear axle to said center of gravity, and a rear lateral velocity.

17. A method as recited in claim 13, wherein said rear lateral tire force is determined in response to a rear tire slip angle and a rear cornering compliance.

18. A method as recited in claim 17, wherein said rear tire slip angle is determined from a vehicle lateral velocity, a yaw rate signal, and a vehicle longitudinal velocity.

19. A method as recited in claim 17, wherein said rear tire slip angle is determined from a vehicle lateral velocity, a yaw rate signal, a vehicle longitudinal velocity, and a rear steering angle.

20. A method as recited in claim 19, wherein said rear steering angle is determined by a gain from body roll due to a steering angle of a rear axle.

21. A method as recited in claim 13, wherein said front lateral tire force is determined in response to a front tire slip angle and a front cornering compliance.

22. A method as recited in claim 13, wherein said front lateral tire force is determined in response to a front tire slip angle, a front cornering compliance, and a front steering angle.

23. A method as recited in claim 22, wherein said front tire slip angle is determined from a vehicle longitudinal velocity, a vehicle lateral velocity, and a yaw rate signal from a yaw rate sensor.

24. A method of controlling a safety system for a vehicle, said method comprising the steps of:
 (a) determining a front lateral tire force and also a rear lateral tire force based on input from both a vehicle yaw rate sensor and a vehicle lateral acceleration sensor;
 (b) determining a calculated lateral velocity from said front lateral tire force, said rear lateral tire force, and a bank angle;
 (c) determining a calculated yaw rate from said front lateral tire force and said rear lateral tire force; and
 (d) controlling said safety system in response to said calculated lateral velocity and said calculated yaw rate.

25. A method as recited in claim 24, wherein said calculated lateral velocity is also determined from a mass of said vehicle.

26. A method as recited in claim 24, wherein said calculated yaw rate is determined from said front lateral tire force, a first distance from a front axle to a center of gravity, a second distance from a rear axle to said center of gravity, and a rear lateral velocity.

27. A method as recited in claim 24, wherein said rear lateral tire force is determined in response to a rear tire slip angle and a rear cornering compliance.

28. A method as recited in claim 27, wherein said rear tire slip angle is determined from a vehicle lateral velocity, a yaw rate signal, and a vehicle longitudinal velocity.

29. A method as recited in claim 27, wherein said rear tire slip angle is determined from a vehicle lateral velocity, a yaw rate signal, a vehicle longitudinal velocity, and a rear steering angle.

30. A method as recited in claim 29, wherein said rear steering angle is determined by a gain from body roll due to a steering angle of a rear axle.

31. A method as recited in claim 24, wherein said front lateral tire force is determined in response to a front tire slip angle and a front cornering compliance.

32. A method as recited in claim 24, wherein said front lateral tire force is determined in response to a front tire slip angle, a front cornering compliance, and a front steering angle.

33. A method as recited in claim 32, wherein said front steering angle is determined in response to a driver input steering angle, a first gain from a body roll angle due to a steering angle of a front axle, and a second gain from a body pitch angle due to a steering angle of said front axle.

34. A method as recited in claim 32, wherein said front tire slip angle is determined from a projection of a longitudinal velocity and a lateral velocity.

35. A method as recited in claim 32, wherein said front tire slip angle is determined from a vehicle longitudinal velocity, a vehicle lateral velocity, and a yaw rate signal from a yaw rate sensor.

* * * * *